May 30, 1967 R. E. BAILEY 3,323,130
STYLUS RELOCATING CIRCUIT FOR WIND DIRECTION RECORDER
Filed Oct. 11, 1965
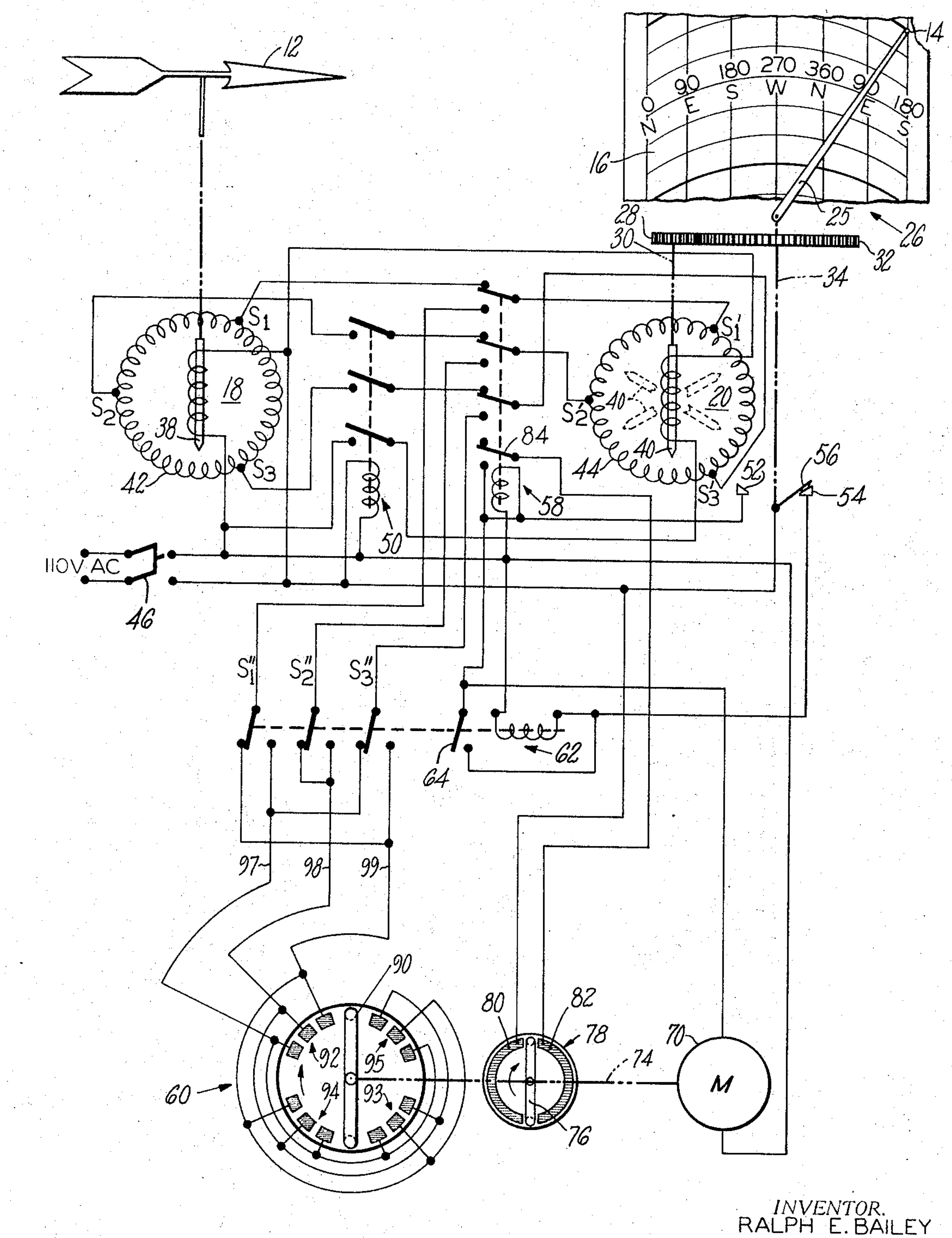
INVENTOR.
RALPH E. BAILEY
BY Lindsey, Prutzman and Hayes
ATTORNEYS United States Patent Office 3,323,130
Patented May 30, 1967

3,323,130

STYLUS RELOCATING CIRCUIT FOR WIND DIRECTION RECORDER

Ralph E. Bailey, 2 Mallard Drive, East Hartford, Conn. 06118

Filed Oct. 11, 1965, Ser. No. 494,369
9 Claims. (Cl. 346—8)

The present invention relates generally to recording systems of the type conventionally employing a synchronous motor follow-up system and a recording stylus operated by the receiving self-synchronous motor of the synchronous motor follow-up system to provide a continuous recording on a moving tape of, for example, the wind direction, and is more particularly directed to a relocating circuit for relocating or resetting the stylus when it reaches the margin of the tape.

The present invention has particular utility in wind direction recording apparatus of the type employing a synchronous motor follow-up system having a rotary self-synchronous transmitting motor or synchro that is driven by a suitable weather vane and a rotary self-synchronous receiving motor or synchro electrically connected to rotate with the transmitting synchro and suitably connected to position a stylus on a moving tape in accordance with the angular position of the weather vane. In a conventional manner the tape may be calibrated with calibration lines for a wind direction of 000° through 360° and with additional calibration lines through a successive 180° for example to preclude the necessity of having to repeatedly relocate or reset the stylus. In any case however it is desirable for the stylus to be relocated or reset as it reaches the marginal calibrations on the tape in order to maintain the wind direction recording accurate and complete.

It is therefore a principal aim of the present invention to provide in a wind direction recording apparatus of the type described, a new and improved stylus relocating system for relocating or resetting the stylus on the tape when the stylus reaches the margins thereof.

It is another aim of the present invention to provide a new and improved relocating circuit for a synchronous motor follow-up system for resetting the receiving self-synchronous motor of the system.

It is a further aim of the present invention to provide in a recording system having a synchronous motor follow-up system and a recorder or register driven in opposite operative directions between operative limits by the receiving motor of the follow-up system, a new and improved relocating circuit for resetting the register when it reaches its operative limits.

It is another aim of the present invention to provide in a motor drive system employing a rotary motor for positioning an associated device in accordance with the angular position of the motor, a new and improved relocating system for selectively rotating the motor.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

The drawing is a schematic representation of a wind direction recording system employing an embodiment of a stylus relocating circuit of the present invention.

Referring now to the drawing in detail, an embodiment of the stylus relocating circuit of the present invention is shown employed in a recording system having a weather vane 12 for sensing the wind direction and a stylus or pen 14 for recording the wind direction onto a tape 16 that may be suitably driven to provide a continuous record thereon. The recording system is shown comprising a synchronous motor follow-up system or selsyn repeating system having a rotary self-synchronous transmitting motor or synchro 18 driven by the weather vane 12 and a rotary self-synchronous receiving motor or synchro 20 electrically connected for synchronous rotation with the transmitting synchro 18. The receiving synchro 20 is in turn mechanically connected to a pivotal stylus support arm 25 of a recorder or register 26, as by reduction gearing including a drive gear 28 fixed to the receiving synchro shaft 30 and a driven gear 32 fixed to a shaft 34 upon which the stylus support arm 25 is mounted. The stylus or pen 14 is thereby adapted to be pivoted across the tape 16 in accordance with the angular position of the receiving synchro 20 and thus the direction of the wind. The tape 16 is shown with its transverse center line aligned with the pivotal axis of the stylus arm, and for assisting in reading the wind direction provided by the recorder the tape is provided with a plurality of transversely spaced calibration lines representing the major points of the compass from 000° through 360° and through an additional 180°, from 000° through 180°.

The transmitting and receiving synchros 18, 20, respectively, are shown having rotors 38, 40, respectively, with single phase armature windings connected in parallel, and stators with three phase field windings 42, 44 having terminals $S_1$, $S_2$, $S_3$ and $S_1'$, $S_2'$, $S_3'$, respectively, connected together. A master ON-OFF switch 46 is shown provided for de-energizing the recording system, and when placed in its ON position the switch 46 provides for activating the self-synchronous system with a relay 50 by connecting the terminals $S_2$, $S_3$ with the terminals $S_2'$, $S_3'$, respectively, and by simultaneously energizing the armature windings as, for example, with a 110 volt A.C. power source.

In accordance with the present invention a relocating circuit is provided for resetting the stylus 14 when it reaches the marginal calibration lines on the tape and to reposition the stylus more centrally on the tape. For this reason a pair of stationary limit switch contacts 52, 54 and a pivotal switch contact 56 mounted on the shaft 34 are provided for sensing when the stylus reaches the marginal calibration lines representing north ("N") and south ("S") respectively.

When the pivotal contact 56 makes contact with the limit contact 52, a relay 58 is energized to disconnect the terminals $S_1'$, $S_2'$, $S_3'$ from the terminals $S_1$, $S_2$, $S_3$ and to thereby deactivate the synchronous motor follow-up system, and to connect the terminals $S_1'$, $S_2'$, $S_3'$ through the leads $S_1''$, $S_2''$, $S_3''$, respectively, with an auxiliary control system or stepping switch mechanism 60 which is thereafter adapted for controlling the field 44 of the receiving synchro. On the other hand, when the pivotal contact 56 makes contact with the limit contact 54, as shown in the drawing, a reversing relay 62 is energized to alter the connection of the leads $S_1''$, $S_2''$, $S_3''$ with the stepping switch mechanism 60 and to thereby in effect reverse the control of the field 44 with the stepping switch mechanism 60. Also, upon energization of the reversing relay 62, the switch 64 of the reversing relay is closed to energize the relay 58 and therefore to deactivate the synchronous motor system and to connect the terminals $S_1'$, $S_2'$, $S_3'$ with the leads $S_1''$, $S_2''$, $S_3''$, respectively. Further, upon energization of the reversing relay 62 or upon the engagement of the pivotal contact 56 with the limit contact 52, a reset motor 70 of the stepping switch mechanism is energized.

A holding switch 78 operated by a shaft 74 driven by the motor 70 provides for maintaining the motor 70 and the relay 58, or the relays 58 and 62 as apropriate, energized while the shaft 74 is rotated 180°. The holding switch 78 is shown including a contact arm 76 driven by the shaft 74 and a pair of substantially semi-circular stationary contacts 80, 82 which function with the switch 84 of the relay 58 to maintain the motor 70 and the relay 58 or relays 58, 62 energized. Also, the shaft 74 is preferably rotated at a fairly low r.p.m., as for example 5 r.p.m., and for this reason the motor may be provided with a suitable speed reducer.

The stepping switch mechanism 60 further includes a rotary stepping switch having a contact arm 90 and a stationary contact plate with two pairs of diametrically opposed series of contacts 92, 93 and 94, 95, respectively. Each pair of diametrically opposed series of contacts include three pairs of diametrically opposed contacts which are connected to leads 97, 98, 99, respectively, and upon specific reference to the drawing it will be seen that the two pairs of series of contacts 92, 93 and 94, 95 are identically connected to the leads 97, 98 and 99. Thus, when the contact arm 90 is rotated 180° from its initial or inactive position shown in the drawing, the leads 97, 98 and 99 will be selectively connected in stepwise fashion through six steps during a half revolution of the wiper blade 90. As a result, when the relays 58 and 62 are energized in conjunction with the pivotal movement of the stylus to the right margin of the tape, the leads $S_1''$, $S_2''$, $S_3''$, and therefore the terminals $S_1'$, $S_2'$, $S_3'$ of the three phase field winding 44 of the receiving synchro 20 will be connected to the leads 97, 98, 99, respectively, and the motor 70 will be energized to revolve the magnetic field resulting from the voltage induced in the field 44 by the single phase armature 40, in the clockwise direction as viewed in the drawing. More particularly, with the stylus 14 at the marginal calibration line as shown in the drawing, the rotor 40 of the receiving synchro will be indexed a full revolution, in the clockwise direction, from its angular position shown in the drawing in stepwise fashion and at 60° per step. As a result, the stylus support arm 25 will be pivoted in the counterclockwise direction as viewed in the drawing to reset the stylus on the "S" calibration line located slightly to the left of the center of the tape. When this resetting cycle is completed after one-half turn of the shaft 74, the relays 62, 58 and the motor 70 will be automatically de-energized and the synchronous motor followup system will be reactivated.

When the pivotal contact 56 engages the other stationary limit contact 52, the stepping switch mechanism 60 will function to step the rotor 40 of the receiving synchro in the counterclockwise direction as viewed in the drawing, i.e., in the angular direction opposite the angular direction resulting from the engagement with the limit contact 54 because of the different order in which the terminals $S_1'$, $S_2'$, $S_3'$ are connected when the reversing relay 62 is de-energized. In this regard, it should be realized that the rotor will have an angular position with the stylus at the left-hand margin of the tape which is the reverse of the angular position of the rotor when the stylus is at the right-hand margin of the tape.

Thus, it can be seen that with the stylus relocating circuit of the present invention, the stylus can be quickly and effectively relocated from the margins of the tape to a position more centrally on the tape. Additionally, once the relocating circuit is activated, it is held energized to fully relocate or reset the stylus. Further, with the relocating circuit of the present invention, the receiving self-synchronous motor of a synchronous motor follow-up system can be quickly and accurately rotated in either angular direction to reposition an associated device driven by the receiving self-synchronous motor.

As will be apparent to persons skilled in the art, various modifications and adaptations of the structure above described will become readily apparent without departure from the spirit and scope of the invention, the scope of which is defined in the appended claims.

I claim:

1. In an indicating system having an electrical synchronous motor follow-up system with a rotary transmitting synchro adapted to be rotated in accordance with the operation of an associated device and a rotary receiving synchro electrically connected to the transmitting synchro for rotation therewith, and an indicating device driven by the receiving synchro in opposite directions between operative limits in accordance with the rotary movement of the receiving synchro in opposite angular directions respectively; resetting means for resetting the indicating device from its operative limits comprising means for sensing when the indicating device reaches its operative limits, and an electrical switching mechanism operated by the sensing means and electrically connected to the synchronous motor follow-up system for electrically stepping the receiving synchro in opposite angular directions for resetting the indicating device in opposite directions from its operative limits respectively.

2. In an indicating system having an electrical synchronous motor follow-up system with a transmitting synchro adapted to be angularly positioned in accordance with the operation of an associated device and a receiving synchro electrically connected to the transmitting synchro for operation in synchronism therewith, the receiving synchro having a rotor and a multiple phase field winding for controlling the angular position thereof, and an indicating device having a pivotal indicating element driven by the rotor of the receiving synchro between pivotal limits in conjunction with the angular movement of the rotor of the receiving synchro through more than one full revolution; a relocating system comprising a rotary stepping switch mechanism operable for short circuiting the phases of the multiple phase field winding of the receiving synchro for rotating the rotor of the receiving synchro substantially one full revolution, and control means for operating the stepping switch mechanism to selectively rotate the rotor substantially one full revolution in opposite angular directions for pivoting the indicating element away from its pivotal limits respectively.

3. In a recording device having an electrical synchronous motor follow-up system with a rotary transmitting synchro adapted to be angularly positioned in accordance with the operation of an associated device, a rotary receiving synchro electrically connected with the transmitting synchro for angular movement in synchronism therewith having a rotor and a multiple phase field winding for generating a magnetic field for controlling the angular position of the rotor, and a recorder driven by the rotor of the receiving synchro for recording the operation of said associated device; a recorder resetting system comprising a switch mechanism connected to the field winding and operable for revolving the magnetic field generated by the field winding for resetting the recorder, and control means for operating the switch mechanism.

4. In a synchronous motor drive system having a rotary transmitting synchro adapted to be rotated in accordance with the operation of an associated device and a rotary receiving synchro electrically connected to the transmitting synchro for operation in synchronism therewith, the transmitting and receiving synchros having rotors adapted for synchronous operation and field windings for generating magnetic fields for maintaining the synchronous operation of the rotors, and a driven device connected to be driven by the rotor of the receiving synchro; a reset system for resetting the driven device comprising a stepping switch operable for revolving the magnetic field of the receiving synchro and for thereby revolving the rotor of the receiving synchro in synchronism therewith, selector means operable for connecting the stepping switch for selectively revolving the rotor of the receiving synchro in either angular direction, and means sensing the operation of the driven device for operating the selector means and the stepping switch for revolving the magnetic field of the receiving synchro in accordance with the operation of the driven device.

5. In a wind direction recording system having an electrical synchronous motor follow-up system with a rotary transmitting synchro adapted to be angularly positioned in accordance with the wind direction, a rotary receiving synchro electrically connected with the transmitting synchro for angular movement in synchronism therewith, the receiving synchro having a rotor and a multiple phase field winding for controlling the angular position thereof, and a recorder having a pivotal stylus driven between pivotal limits in conjunction with the angular movement of the rotor of the receiving synchro through more than one full revolution; a relocating circuit comprising a rotary stepping switch operable through a cycle to short circuit the phases of the multiple phase field winding of the receiving synchro in stepwise fashion and thereby revolve the magnetic field generated thereby through substantially one full revolution, means for sensing when the stylus reaches its pivotal limits, first relay means operable by the sensing means when the stylus reaches either of its pivotal limits to deactivate the self-synchronous motor follow-up system and to connect the multiple phase field winding of the receiving synchro with the rotary stepping switch, and selector relay means operable by the sensing means for selectively connecting the multiple phase field winding with the stepping switch for rotating the magnetic field generated by the multiple phase field winding in opposite angular directions for pivoting the stylus away from its pivotal limits respectively.

6. In a wind direction recording system having an electrical synchronous motor follow-up system with a rotary transmitting synchro adapted to be angularly positioned in accordance with the wind direction, a rotary receiving synchro electrically connected with the transmitting synchro for angular movement in synchronism therewith, the receiving synchro having a multiple phase field winding for controlling the angular position thereof, and a recorder having a pivotal stylus driven by the receiving synchro between pivotal limits in conjunction with the angular movement of the receiving synchro through more than one full revolution; a relocating system comprising a rotary stepping switch operable to short circuit the phases of the multiple phase field winding of the receiving synchro in stepwise fashion in order to revolve the magnetic field generated thereby through substantially one full revolution, relay means operable to deactivate the self-synchronous motor follow-up system and to selectively connect the multiple phase field winding of the receiving synchro with the rotary stepping switch for rotating the magnetic field generated thereby in either angular direction, and sensing means operative by the recorder for operating the relay means and stepping switch for rotating the magnetic field generated by the field winding of the receiving synchro and thereby pivot the stylus away from its pivotal limits.

7. In a recording system having a stylus operable between limit positions in accordance with the angular movement of a rotatable member through at least 360°, an electric motor having a rotor operatively connected to the stylus and a field winding which is controllable for angularly positioning the rotor, a relocating circuit for relocating the stylus when it reaches its limit positions comprising a switching mechanism connected to the field winding and operable for rotating the magnetic field generated by the field winding, and control means operable in conjunction with the operation of the stylus to its limit positions for operating the switching mechanism to rotate the magnetic field generated by the field winding for resetting the stylus away from its limit positions.

8. In a recording system having a stylus operable between limit positions in accordance with the angular movement of a rotatable member through at least 360°, an electric motor having a rotor operatively connected to the stylus and a three phase field winding which is controllable for angularly positioning the rotor, a stylus relocating circuit comprising a stepping switch operable for short circuiting the three phases of the field winding of the electric motor in stepwise fashion and to thereby rotate the rotor of the electric motor substantially a complete revolution in stepwise fashion and at 60° per step, a reversing relay for selectively connecting the stepping switch to the three phase field winding for selectively rotating the rotor in opposite angular directions respectively, and control means operable in conjunction with the movement of the stylus to its limit positions for operating the stepping switch and the reversing relay to reset the stylus away from its limit positions.

9. In the recording system of claim 8 wherein the stepping switch comprises a stationary switch plate having two pairs of diametrically opposed series of contacts with the series of contacts of each pair having three pairs of diametrically opposed contacts connected for short circuiting the three phases of the field winding of the electric motor, and a rotatable contact arm adapted for connecting the diametrically opposed contacts and thereby short circuit the three phases of the field in sequence.

References Cited

UNITED STATES PATENTS

| | | | |
|---|---|---|---|
| 1,958,909 | 5/1934 | Chappell et al. | 73—188 |
| 2,643,932 | 6/1953 | Musante | 346—8 |
| 2,770,129 | 11/1956 | Dalzell | 73—188 |
| 2,795,475 | 6/1957 | Dalzell | 346—8 |

RICHARD B. WILKINSON, *Primary Examiner.*

J. W. HARTARY, *Assistant Examiner.*